(12) United States Patent
Barrett (10) Patent No.: US 9,380,542 B2
(45) Date of Patent: Jun. 28, 2016

(54) COMMUNICATION UNITS AND METHODS FOR POWER CONTROL OF BROADCAST COMMUNICATION

(71) Applicant: SCA IPLA HOLDINGS INC., New York, NY (US)

(72) Inventor: Stephen John Barrett, Thatcham (GB)

( * ) Notice: Subject to any disclaimer, the term of this patent is extended or adjusted under 35 U.S.C. 154(b) by 165 days.

(21) Appl. No.: 14/164,830

(22) Filed: Jan. 27, 2014

(65) Prior Publication Data

US 2014/0140266 A1    May 22, 2014

Related U.S. Application Data

(63) Continuation of application No. 14/000,302, filed as application No. PCT/GB2012/050369 on Feb. 17, 2012, now abandoned.

(30) Foreign Application Priority Data

Feb. 18, 2011 (GB) .................................. 1102818.0

(51) Int. Cl.
*H04W 52/24* (2009.01)
*H04W 52/32* (2009.01)
*H04W 52/20* (2009.01)

(52) U.S. Cl.
CPC ............ *H04W 52/24* (2013.01); *H04W 52/322* (2013.01); *H04W 52/20* (2013.01)

(58) Field of Classification Search
USPC ......... 370/315, 329, 252, 312, 328, 330, 332, 370/226, 246, 281, 293, 331, 333, 338, 370/390; 455/522, 453, 69, 436, 63.1, 11.1, 455/13.1, 424, 450, 458, 127.1, 16, 24, 437, 455/438, 443, 444, 445, 448, 449, 452.1, 455/452.2, 456.5, 509, 515, 560, 63.2, 455/67.14, 7, 70

See application file for complete search history.

(56) References Cited

U.S. PATENT DOCUMENTS 7,164,890 B2 * 1/2007 Eriksson et al. ................ 455/69
7,363,010 B2   4/2008 Oh et al.
(Continued)

FOREIGN PATENT DOCUMENTS

EP    1 530 307 A1    5/2005
EP    1 734 668 A1   12/2006
(Continued)

OTHER PUBLICATIONS

Search Report issued Jun. 10, 2011 in United Kingdom Patent Application No. GB1102818.0.
(Continued)

*Primary Examiner* — Phuongchau Ba Nguyen
(74) *Attorney, Agent, or Firm* — Oblon, McClelland, Maier & Neustadt, L.L.P.

(57) ABSTRACT

A method and communication unit for power control in a wireless broadcast communication system that includes a plurality of communication cells, with broadcast content being routed from a base station to at least one wireless communication unit via at least one relay node (RN). The method includes, at the base station: broadcasting the broadcast content from the base station to at least one RN; receiving from the at least one RN an indication of signal quality of the broadcast content as received at the at least one RN; and adjusting a transmit power level of a broadcast transmission of broadcast content in response to the indication.

21 Claims, 7 Drawing Sheets

(56) References Cited

U.S. PATENT DOCUMENTS

| | | | |
|---|---|---|---|
| 7,933,236 B2* | 4/2011 | Wang et al. | 370/328 |
| 8,059,545 B2* | 11/2011 | Jeon et al. | 370/236 |
| 8,135,337 B2* | 3/2012 | Larsson | 455/11.1 |
| 8,243,632 B1* | 8/2012 | Oh et al. | 370/277 |
| 8,320,290 B2* | 11/2012 | Chao et al. | 370/312 |
| 8,654,695 B2* | 2/2014 | Jalloul et al. | 370/312 |
| 8,761,056 B2* | 6/2014 | Hyun et al. | 370/259 |
| 8,942,156 B2* | 1/2015 | Yang et al. | 370/312 |
| 2002/0065094 A1* | 5/2002 | Schmutz et al. | 455/522 |
| 2006/0166690 A1 | 7/2006 | Nishio et al. | |
| 2006/0293074 A1* | 12/2006 | Bottomley et al. | 455/522 |
| 2010/0264746 A1 | 10/2010 | Kazama et al. | |
| 2010/0272009 A1* | 10/2010 | Cheng et al. | 370/315 |
| 2010/0317284 A1* | 12/2010 | Charbit et al. | 455/7 |
| 2011/0081903 A1* | 4/2011 | Cai et al. | 455/424 |
| 2011/0103269 A1* | 5/2011 | Zheng | 370/279 |
| 2011/0194407 A1* | 8/2011 | Ji et al. | 370/226 |
| 2011/0195708 A1* | 8/2011 | Moberg et al. | 455/424 |
| 2011/0249620 A1* | 10/2011 | Yu et al. | 370/328 |
| 2012/0009963 A1* | 1/2012 | Kim et al. | 455/509 |
| 2012/0155361 A1* | 6/2012 | Wei et al. | 370/312 |
| 2013/0343259 A1* | 12/2013 | Barrett | 370/312 |
| 2013/0343262 A1* | 12/2013 | Barrett | 370/315 |
| 2014/0020031 A1* | 1/2014 | Barrett | 725/62 |
| 2014/0140266 A1* | 5/2014 | Barrett | 370/315 |

FOREIGN PATENT DOCUMENTS

| | | | | |
|---|---|---|---|---|
| EP | 1 734 669 A2 | 12/2006 | | |
| EP | 1734668 A1 * | 12/2006 | | H04B 7/005 |
| EP | 1734669 A2 * | 12/2006 | | H04B 7/005 |
| WO | WO 2007/064249 A1 | 6/2007 | | |
| WO | WO 2007064249 A1 * | 6/2007 | | H04L 12/56 |

OTHER PUBLICATIONS

International Search Report issued May 7, 2012 in PCT/GB2012/050369.

* cited by examiner

COMMUNICATION UNITS AND METHODS FOR POWER CONTROL OF BROADCAST COMMUNICATION

CROSS-REFERENCE TO RELATED APPLICATIONS

This application is a continuation application of U.S. application Ser. No. 14/000,302, filed Aug. 19, 2013, which is a 371 national stage of International Application No. PCT/GB2012/050369, filed Feb. 17, 2012. The present application claims priority to British Patent Application 1102818.0 filed in the U.K. on Feb. 18, 2011. The entire contents of each of these documents are incorporated herein by reference.

FIELD OF THE INVENTION

The field of the invention relates to utilisation of communication resources in cellular communication systems and in particular, but not exclusively, to supporting power control of broadcast communication in a long term evolution (LTE) $3^{rd}$ Generation Partnership Project (3GPP™) cellular communication system.

BACKGROUND OF THE INVENTION

Currently, 3rd generation cellular communication systems are being installed to further enhance the communication services provided to mobile phone users. The most widely adopted 3rd generation communication systems are based on Code Division Multiple Access (CDMA) and Frequency Division Duplex (FDD) or Time Division Duplex (TDD) technology. In CDMA systems, user separation is obtained by allocating different spreading and/or scrambling codes to different users on the same carrier frequency and in the same time intervals. This is in contrast to time division multiple access (TDMA) systems, where user separation is achieved by assigning different time slots to different users. An example of communication systems using these principles is the Universal Mobile Telecommunication System (UMTST™).

In order to provide enhanced communication services, the long term evolved (LTE) version of 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth. The typical and most cost-effective approach in the provision of multimedia services is to 'broadcast' the multimedia signals, as opposed to sending the multimedia signals in an unicast (i.e. point-to-point) manner. Typically, tens of channels carrying say, news, movies, sports, etc., may be broadcast simultaneously over a communication network. Further description of LTE, can be found in Sesia, Toufik, Baker: 'LTE—The UMTS Long Term Evolution; From Theory to Practice', page 11. Wiley, 2009.

As radio spectrum is at a premium, spectrally efficient transmission techniques are required in order to provide users with as many broadcast services as possible, thereby providing mobile phone users (subscribers) with the widest choice of services. It is known that broadcast services may be carried over cellular networks, in a similar manner to conventional terrestrial Television/Radio transmissions. Thus, technologies for delivering multimedia broadcast services over cellular systems, such as the evolved Mobile Broadcast and Multicast Service (eMBMS) for the LTE aspect of UMTS™, have been developed over the past few years. In these broadcast cellular systems, the same broadcast signal is transmitted over non-overlapping physical resources on adjacent cells within a conventional cellular system. Consequently, at the wireless subscriber unit, the receiver must be able to detect the broadcast signal from the cell it is connected to. Notably, this detection needs to be made in a presence of additional, potentially interfering broadcast signals, transmitted on the non-overlapping physical resources of adjacent cells.

To improve spectral efficiency, broadcast solutions have also been developed for cellular systems in which the same broadcast signal is transmitted by multiple cells but using the same (i.e. overlapping) physical resources. In these systems, cells do not cause interference to each other as the transmissions are arranged to be substantially time-coincident, and, hence, capacity is improved for broadcast services. Such systems are sometimes referred to as 'Single Frequency Networks', or 'SFNs'. In SFN systems, a common cell Identifier (ID) is used to indicate those (common) cells that are to broadcast the same content at the same time. In the context of the present description, the term 'common cell identifier' encompasses any mechanism for specifying SFN operation, which may in some examples encompass a use of, say, a single scrambling code.

Figure 1:
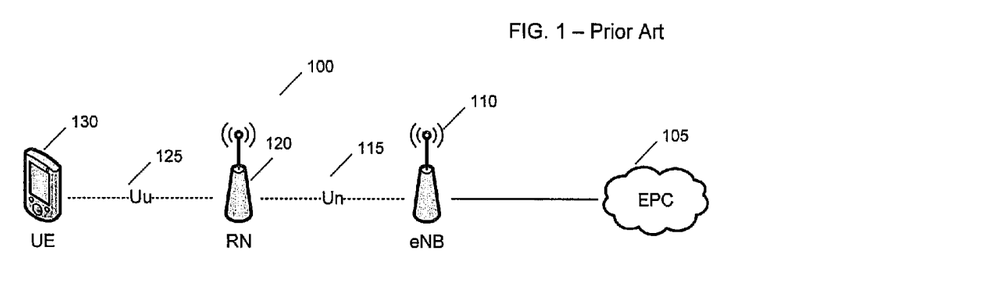
FIG. 1 illustrates a known architecture of system deployment with a relay node.

In 3GPP™ Re110 a concept 100 of relay nodes is being considered for LTE, as illustrated in FIG. 1. The relay node concept 100 involves a deployment of relay nodes (RNs) 120 that are configured/located to extend radio coverage over a Uu interface 125 to those subscriber communication units (referred to as user equipment (UE) in 3G parlance) 130 that are within the coverage area of the RN 120, but may not be in a coverage range of a serving base station, such as an evolved NodeB (eNodeB in 3G parlance). Backhaul connectivity for the RN 120 is provided using the LTE radio resource over the Un interface 115. In this manner, the RN 120 is connected over the LTE radio resource to an evolved packet core (EPC) 105 via a communication source base station (eNodeB) that (in this context) may be known as a Donor eNodeB (DeNB) 110. From a perspective of a UE 130 within the coverage range of the RN 120, the RN 120 appears as a conventional eNodeB. From a perspective of the DeNB 110, the RN 120 appears somewhat like a UE 130.

The issue of supporting eMBMS over a RN has been raised in (Tdoc R2-103960: 'Considerations on deployment of both relay and eMBMS'. CMCC, 3GPP TSG-RAN WG2 meeting #70bis, Stockholm, Sweden, 28 Jun.-2 Jul. 2010). In this document a method for extending eMBMS was briefly described:

'Under this architecture, the content synchronization should be guaranteed not only from BM-SC to DeNB, but also from BM-SC to RN. In this case, the eMBMS related data needs to be transmitted to the DeNB firstly, and then be forwarded towards the corresponding RNs before transmitting to the UEs.'

This extract clearly suggests to those in the art that the Donor eNodeB 110 would first forward eMBMS traffic from the DeNB 110 to the RN 120 using a unicast bearer, although no bearer is specified. Once the RNs 120 have received the eMBMS data then both DeNB's 110 and RN's 120 can transmit the eMBMS data over the single frequency at the same time, such that UE's 130 can easily combine at the physical layer the transmissions from all eNodeB's and RN's 120 within range. With any RN approach it is very important that the RN 120 decodes the MBMS traffic received from the DeNB 110 over the Un 115 as accurately as possible since the RN 120 may be re-broadcasting this information to many 10s of UEs 130 over the Uu 125. Very few solutions have so far been described or discussed to address this need.

Consequently, current techniques are suboptimal. Hence, an improved mechanism for improving a probability of correct detection of an MBMS signal at the RN in a cellular network that uses a RN concept would be advantageous.

SUMMARY OF THE INVENTION

Various aspects and features of the present invention are defined in the claims.

Embodiments of the invention seek to mitigate, alleviate or eliminate one or more of the abovementioned disadvantages singly or in any combination.

According to a first aspect of the invention, there is provided a method for power control in a wireless broadcast communication system that comprises a plurality of communication cells, with broadcast content being routed from a base station to at least one wireless communication unit via at least one relay node (RN). The method comprises, at the base station, broadcasting the broadcast content from the base station to at least one RN; receiving from the at least one RN an indication of signal quality of the broadcast content as received at the at least one RN; and adjusting a transmit power level of a broadcast transmission of broadcast content in response to the indication. In this manner, power control can be supported in a system that comprises an intermediary wireless node, such as a relay node.

In one optional example embodiment, the indication of signal quality received from the at least one RN may comprise at least one from a group consisting of: a recommendation for an increase or decrease in the transmit power level of the broadcast content, a command for an increase or decrease in the transmit power level of the broadcast content. In this manner, the RN may influence a direction of power control adjustment. In one optional example embodiment, the indication of signal quality from the at least one RN may comprise receiving an indication of an amount to increase or decrease the transmit power level of the broadcast content in the recommendation. In this manner, the RN may attempt to set a level of power control adjustment.

In one optional example embodiment, receiving the indication of signal quality received from the at least one RN may comprise at least one from a group of: receiving a bit error rate of the broadcast content received at the at least one RN; receiving a frame error rate of the broadcast content received at the at least one RN; receiving a block error rate of the broadcast content received at the at least one RN; receiving a signal-to-interference ratio (SIR) indication as measured at the at least one RN; receiving a received signal power indication of the broadcast content as received at the at least one RN. In this manner, the RN may re-use existing signal quality measurements to influence a direction or setting of a power control adjustment.

In one optional example embodiment, the method may further comprise determining in response to the indication of signal quality of the broadcast content whether a transmit power level of a broadcast transmission of broadcast content may be adjusted in accordance with the communication circumstances that the base station is operating in.

In one optional example embodiment, the method may further comprise determining whether a proposed transmit power level of a broadcast transmission of broadcast content exceeds a first threshold or is below a second threshold. In some example embodiments, the method may further comprise decreasing the transmit power of the broadcast transmission if a plurality of receiving relay nodes request a decrease.

In one optional example embodiment, adjusting the transmit power level of the broadcast transmission of broadcast content in response to the indication may comprise adding or subtracting a transmit power control delta value from a current transmit power level following a waiting period.

In one optional example embodiment, the base station is a donor eNodeB in a Long Term Evolution (LTE) version of a Third Generation Partnership Project (3GPP™) system.

According to a second aspect of the invention, there is provided a non-transitory computer program product comprising executable program code for supporting power control in a wireless broadcast communication system that comprises a plurality of communication cells, with broadcast content being routed from a base station to at least one wireless communication unit via at least one relay node (RN), substantially in accordance with the first aspect.

According to a third aspect of the invention, there is provided a base station for supporting power control in a wireless broadcast communication system that comprises a plurality of communication cells, with broadcast content being routed from the base station to at least one wireless communication unit via at least one relay node (RN). The base station comprises: signal processing logic for broadcasting the broadcast content from the base station to at least one RN; a receiver for receiving from the at least one RN an indication of signal quality of the broadcast content as received at the at least one RN; and power control logic arranged to adjust a transmit power level of a broadcast transmission of broadcast content in response to the indication.

According to a fourth aspect of the invention, there is provided an integrated circuit for a base station comprising signal processing logic substantially in accordance with the third aspect.

According to a fifth aspect of the invention, there is provided a method for supporting power control in a wireless communication system that comprises a plurality of communication cells, with broadcast content being routed from a base station to at least one wireless communication unit via a relay node (RN). The method comprises, at the relay node: receiving broadcast content from the base station; determining an indication of signal quality of the broadcast content as received at the RN; transmitting the indication of signal quality of the broadcast content to the base station; and receiving subsequent broadcast content from the base station at an adjusted transmit power level in response to the indication.

In one optional example embodiment, the the indication of signal quality may comprise at least one from a group consisting of: a recommendation for an increase or decrease in the transmit power level of the broadcast content, a command for an increase or decrease in the transmit power level of the broadcast content.

In one optional example embodiment, transmitting the indication of signal quality may comprise transmitting an indication of an amount to increase or decrease the transmit power level of the broadcast content in the recommendation.

In one optional example embodiment, transmitting the indication of signal quality received comprises at least one from a group of: transmitting a bit error rate of the broadcast content received at the RN; transmitting a frame error rate of the broadcast content received at the RN; transmitting a block error rate of the broadcast content received at the RN; transmitting a signal-to-interference ratio (SIR) indication as measured at the at least one RN; transmitting a received signal power indication of the broadcast content as received at the RN.

In one optional example embodiment, the method may further comprise determining further in response to the determination an indication of signal quality of the broadcast content whether an adjustment of transmit power level of a subsequent broadcast transmission of broadcast content may improve a decoding operation of the broadcast content.

In one optional example embodiment, receiving subsequent broadcast content from the base station at an adjusted transmit power level in response to the indication may comprise receiving subsequent broadcast content with an added or subtracted transmit power control delta value from a current transmit power level following a waiting period.

According to a sixth aspect of the invention, there is provided a non-transitory computer program product comprising executable program code for supporting power control in a wireless broadcast communication system that comprises a plurality of communication cells, with broadcast content being routed from a base station to at least one wireless communication unit via a relay node (RN), substantially in accordance with the fifth aspect.

According to a seventh aspect of the invention, there is provided a relay node for supporting power control in a wireless broadcast communication system that comprises a plurality of communication cells, with broadcast content being routed from a base station to at least one wireless communication unit via the relay node (RN). The RN comprises a receiver for receiving broadcast content from the base station; signal processing logic for: determining an indication of signal quality of the broadcast content as received at the RN; a transmitter for transmitting the indication of signal quality of the broadcast content to the base station; wherein the receiver receives subsequent broadcast content from the base station at an adjusted transmit power level in response to the indication.

According to an eighth aspect of the invention, there is provided an integrated circuit for a relay node comprising signal processing logic substantially in accordance with the seventh aspect.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

The following description focuses on embodiments of the invention applicable to a Long Term Evolution (LTE) cellular communication system and, in particular, to an LTE Radio Access Network (RAN) operating in any paired or unpaired spectrum within a $3^{rd}$ generation partnership project (3GPP™) system. However, it will be appreciated that the invention is not limited to this particular cellular communication system, but may be applied to any cellular communication system supporting broadcast communication. The following description also focuses on embodiments of the invention applicable to providing broadcast (e.g. uni-directional) services on an LTE cellular communication system, for example one supporting an evolved Mobile Broadcast and Multicast Service (eMBMS). eMBMS is a broadcasting and multicasting service offered over mobile telecommunications networks, such as the Evolved Packet System (EPS), and the like. The technical specifications for eMBMS include 3GPP™ TS 22.146, 3GPP™ TS 23.246 and 3GPP™ TS 26.346.

Example embodiments described herein may be applied to a scenario whereby eMBMS data is transported over LTE relay nodes (RNs). Example embodiments of the invention, when applied to a cellular communication system that comprises relay nodes, include a power control (PC) mechanism for improving a probability of correct detection of the MBMS signal at a relay node, based on communication between one or more RNs and their respective DeNB(s). Advantageously, example embodiments of the invention employing such a PC concept enable a relay node to decode the MBMS traffic received from a DeNB as accurately as possible, since it may be re-broadcasting this information to many tens of UE's.

Figure 2:
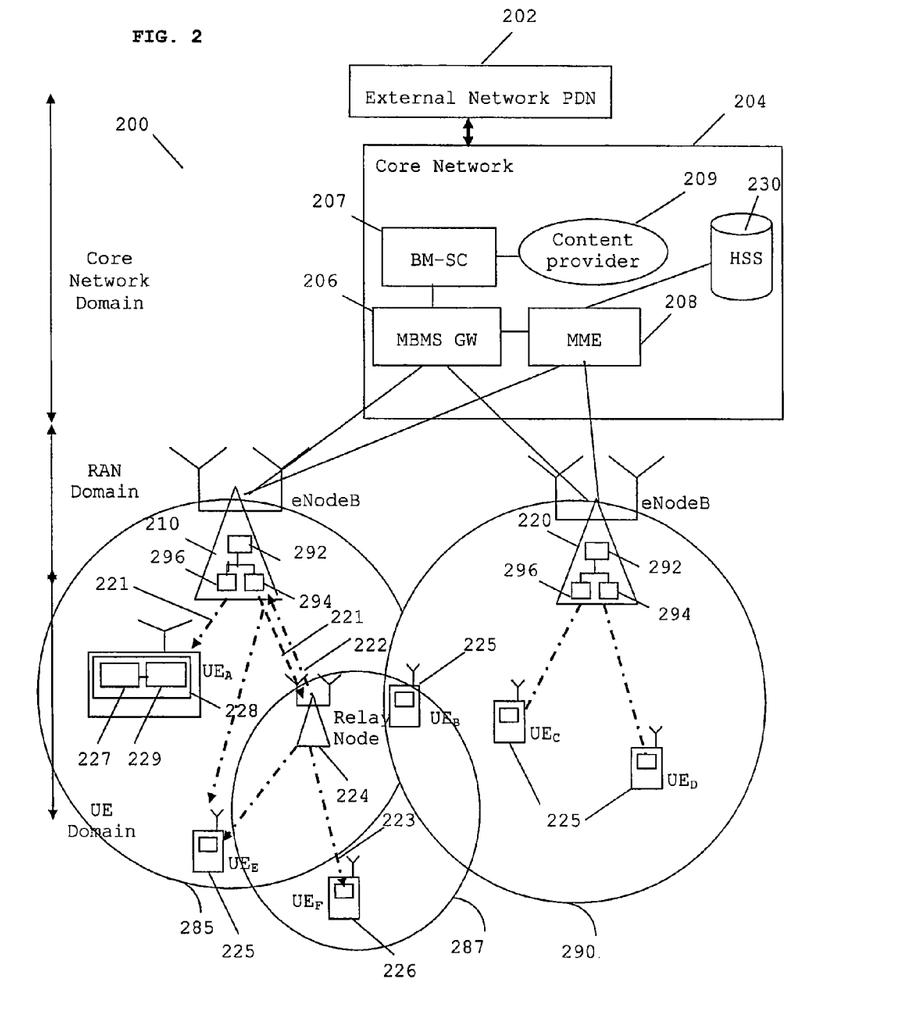
FIG. 2 illustrates a 3GPP™ LTE cellular communication system employing at least one relay node in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. E-UTRAN RAN is based on OFDMA (orthogonal frequency division multiple access) in downlink (DL) and SC-FDMA (single carrier frequency division multiple access) in uplink (UL), where the further information of radio frame formats and physical layer configuration used in E-UTRAN can be found in 3GPP™ TS 36.211 v.9.1.0 (2010-03), '3GPP Technical specification group radio access network, physical channels and modulation (release 9). Within LTE, both time division duplex (TDD) and frequency division duplex (FDD) modes are defined. In particular, the example embodiment of the LTE system may be adapted to support broadcast E-UTRAN communication in one or more communication cells.

The wireless communication system 200 architecture consists of radio access network (RAN) and core network (CN) elements, with the core network 204 being coupled to external networks 202 (named Packet Data Networks (PDNs)), such as the Internet or a corporate network. The main component of the RAN is an eNodeB (an evolved NodeB) 210, 220, which performs many standard base station functions and is connected to the CN 204 via S1 interface and to the UEs 225, 226 via an Uu interface. A wireless communication system will typically have a large number of such infrastructure elements where, for clarity purposes, only a limited number are shown in FIG. 2. The eNodeBs 210, 220 control and manage the radio resource related functions for a plurality of wireless subscriber communication units/terminals (or user equipment (UE) 225 in UMTS™ nomenclature).

The eNodeBs 210, 220, are operably coupled to an MBMS gateway 206 in the core network (CN) via an M1 interface and to a mobility management entity (MME) 208 in the core network (CN) via an M3 interface. The MME 208 manages session control of MBMS bearers and is operably coupled to a home subscriber service (HSS) database 230 storing UE related information. The MBMS gateway 206 acts as a mobility anchor point and provides IP multicast distribution of the MBMS user plane data to the eNodeBs. The MBMS gateway 206 receives MBMS content via the Broadcast Multicast Service Centre (BM-SC) 207 from one or more content providers 209.

As illustrated, each eNodeB 210, 220 comprises one or more wireless transceiver unit(s) 294 that is/are operably coupled to a signal processor module 296 and power control logic 292. Embodiments of the invention utilize the one or more wireless transceiver unit(s) 294, the signal processor module 296 and power control logic 292 to configure a transmit power level of broadcast transmissions from the eNodeB 210.

Each of the UEs comprise a transceiver unit 227 operably coupled to signal processing logic 229 (with one UE illustrated in such detail for clarity purposes only) and communicate with the eNodeB 210 supporting communication in their respective location areas. The system comprises many other UEs 225, RNs 224 and eNodeBs 210, 220, which for clarity purposes are not shown.

In one illustrated example embodiment, the eNodeB 210 broadcasts eMBMS content/data to relay node (RN) 224 (with only one RN shown for clarity purposes), located within its coverage range 285, for relaying to UEs such as UE 225 within the coverage of both the eNodeB 210 and the RN 224 as well as UEs, such as UE 226 outside the coverage of the eNodeB 210 but within the extended coverage provided by the RN 224. The broadcast eMBMS data 221 may also be received by UEs 225 and any Relay Nodes (RNs), such as RN 224 within coverage range 285. The RN 224 supports broadcast eMBMS communication over geographic area 287.

The one or more eNodeBs 210, 220 typically perform lower layer processing for the network, performing such functions as Medium Access Control (MAC), formatting blocks of data for transmission and physically transmitting transport blocks to UEs 225. In accordance with some example embodiments of the invention, the transceiver of the eNB is arranged to broadcast eMBMS content to RNs and UEs. In addition, in accordance with some example embodiments of the invention, the transceiver of the eNB is arranged to receive power control signals, in a form of a request or a command, from one or more RNs.

In some examples, the received power control signals may contain signal quality information as perceived by the RN, or a request for an increase or decrease of transmitted power level, as calculated and deemed suitable for the particular RN. In some examples, the signal processing module 296 is arranged to process signals for broadcast to RNs and UEs. In some example embodiments of the invention, the signal processing module 296 is further arranged to process received power control signals from the one or more RNs, and either provide an instruction, or process and relay information, to the power control logic 292. In response to the instruction or relayed information, the power control logic 292 (in conjunction with the transceiver 294) of eNodeBs 210, 220 is arranged to adapt the transmit power levels of broadcast eMBMS content to the RNs, if such adaptation is appropriate to the communication circumstance that the eNB is operating. In one example embodiment, in response to the instruction or relayed information, the power control logic 292 of the eNB 210, 220 may increase a power level of broadcast transmissions to the RN 224, or the power control logic 292 of the eNB 210, 220 may decrease a power level of broadcast transmissions to the RN 224.

Figure 3:
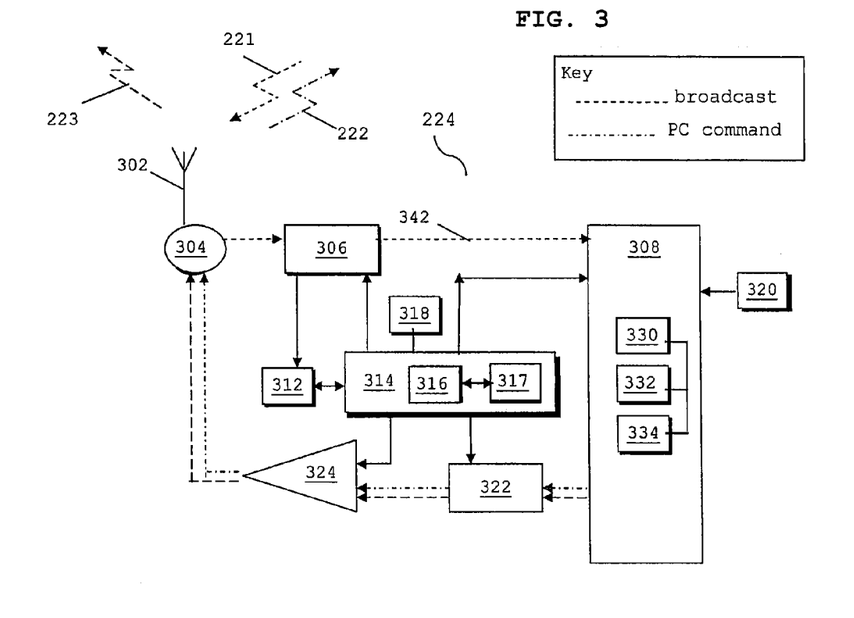
FIG. 3 illustrates an example of a wireless communication unit adapted in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a relay node, such as RN 224 of FIG. 2. However, a skilled artisan will appreciate that similar high-level circuit architecture may exist in a DeNB, such as eNB 210 of FIG. 2. The wireless communication unit 224 contains an antenna, an antenna array 302, or a plurality of antennae, coupled to antenna switch 304 that provides isolation between receive and transmit chains within the wireless communication unit 314. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realised by a digital signal processor (DSP)). The one or more receiver chain(s) is/are operably configured to receive a broadcast data packet stream in one or more sub-frames over an eMBMS network. A skilled artisan will appreciate that the level of integration of using receiver circuits or components may be, in some instances, implementation-dependent.

The receiver chain includes received signal quality indicator logic or circuitry 312, which in turn is coupled to a controller 314 that maintains overall relay node control. In alternative embodiments, the received signal quality indicator logic or circuitry 312 may be part of the signal processing module 308. In example embodiments, two sets of receive signal quality may be used. In one example, an inner power control loop may be driven completely off of a signal-to-interference (SIR) estimate. In one example, an outer power control loop may be driven off, say, bit error rate (BER), frame error rate (FER) and/or block error rate (BLER) data.

In one example, the inner power control loop SIR signal quality indication may involve, decoding the data then re-encoding the data using the same processes used in the transmitter followed by comparing this 'clean' signal with the signal that was actually received in order to determine the noise level that was added on by the channel. In other examples, less complex approaches may be used, for example based on a magnitude of error metrics in the decoder.

The controller 314 or signal processing module 308 may therefore receive (outer loop and inner loop) from signal quality indicator logic or circuitry 312 or calculate signal quality information from recovered broadcast content information. Alternatively, the received signal quality information may comprise a value, for example based on a SIR signal quality indication and/or bit error rate (BER), frame error rate (FER) or block error rate (BLER) data, calculated at the RN and based on recovered broadcast content information. A controller 314 maintains overall operational control of the wireless communication unit 224. The controller 314 is also coupled to the receiver front-end circuitry 306 and the signal processing module 308. In some examples, the controller 314 is also coupled to a buffer module 317 and a memory device 316 that selectively stores operating regimes, such as decoding/encoding functions, synchronisation patterns, code sequences, and the like. A timer 318 is operably coupled to the controller 314 to control the timing of operations (transmission or reception of time-dependent signals) within the wireless communication unit 224.

As regards the transmit chain, this essentially includes an eMBMS input module 320, coupled in series through transmitter/modulation circuitry 322 and a power amplifier 324 to the antenna, antenna array 302, or plurality of antennae. The transmitter/modulation circuitry 322 and the power amplifier 324 are operationally responsive to the controller 314 and operably configured to broadcast a received eMBMS data packet stream to a plurality of UEs within coverage range of the wireless communication unit (RN) 224.

In a transmit mode of operation, the controller 314 or signal processing module 308 may therefore use the outer loop and/or inner loop information or value(s) from signal quality indicator logic or circuitry 312, for example by generating and/or calculating one or more power control (PC) to be routed via transmitter/modulation circuitry 322 and the power amplifier 324 for RF transmission.

The signal processor module 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 224 can be realized in discrete or integrated component form, with an ultimate structure therefore being an application-specific or design selection.

In one example, the RN 224 may be configured as a simple repeater, whereby it receives a broadcast eMBMS transmission from the DeNB 210, performs any demodulation, decoding, error correction, encoding, modulation and re-broadcasts the eMBMS data. In some examples, the RNs 224 may perform lower layer processing for the network, performing such functions as Medium Access Control (MAC), formatting blocks of data for re-transmission and physically transmitting transport blocks to UEs 225, 226.

In accordance with some example embodiments of the invention, the transceiver of the RN 224 is arranged to receive broadcast eMBMS content 221 from at least one DeNB, such as eNB 210 of FIG. 2, and re-broadcast the received eMBMS content to UEs within the RN's coverage range. In addition, in accordance with some example embodiments of the invention, the transceiver of the RN 224 is arranged to receive the eMBMS content 221 and the signal processing module 308 measure a quality of the received eMBMS content. Based on this signal quality assessment, the signal processing module 308 may decide to initiate a change in received signal power from the DeNB, via say a transmission of a power control signal 222, in a form of a request or a command, to the one or more DeNBs. In some examples, the transmitted power control signal 222 may contain signal quality information, as perceived by the RN 224, or a request for an increase or decrease of transmitted power level, as calculated and deemed suitable for the RN 224. In some example embodiments of the invention, the receiver 306 of the RN 224 is further arranged to receive subsequent eMBMS content from the DeNB at the adjusted power level, where the adjustment is effected at the DeNB as a result of the transmitted power control signal from the RN 224, if such power level adaptation is appropriate to the communication circumstances that the DeNB is operating in.

In one example embodiment, one or more threshold limits may be applied in the RN's outer loop power control algorithm, for example to prevent signal-to-interference ratio (SIR) target runaway (e.g. a maximum SIR target value threshold). Such runaway can occur when the RN increases its SIR target as the RN wants more power to be transmitted by the DeNB, but the DeNB is unable to transmit at a higher level, for example due to a maximum transmit power limitation. In this scenario, the SIR target may increase and become meaningless or set inappropriately. Thus, the transmit power level may take time to adapt when channel conditions subsequently do improve.

In one example, the DeNB may determine, in response to a received determination of an indication of signal quality of the broadcast content from the RN, whether (or not) an adjustment of transmit power level of a subsequent broadcast transmission of broadcast content may improve a decoding operation of the broadcast content. For example, the DeNB may determine whether (or not) an adjustment of transmit power level of a subsequent broadcast transmission of broadcast content may improve a decoding operation of the broadcast content based on whether the received determination of an indication of signal quality of the broadcast content from the RN exceeds or falls below a particular inner power control loop threshold level.

The RN 224 also re-broadcasts 223 the broadcast content to one or more UEs within its coverage range.

Figure 4:
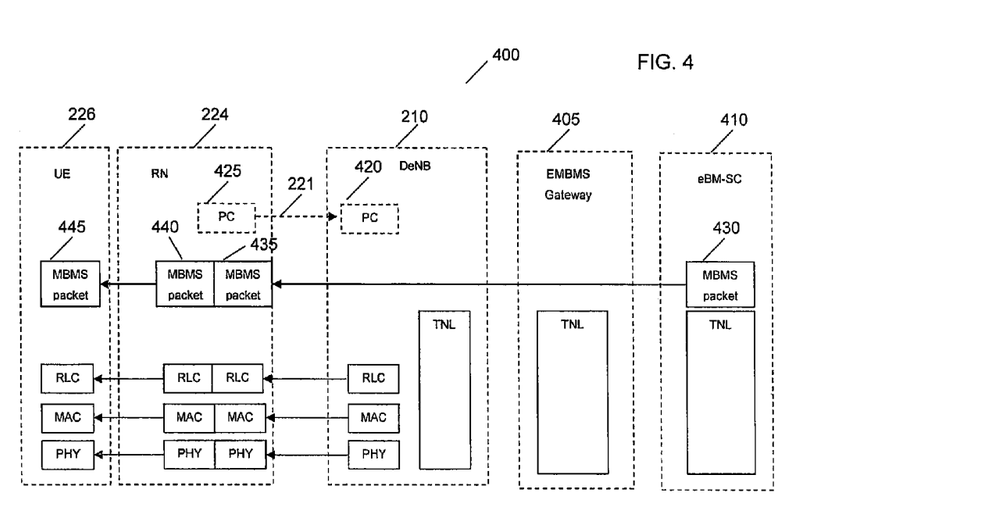
FIG. 4 illustrates a first example of a user-plane protocol stack employed by various communication units in accordance with some example embodiments of the present invention.

In one example embodiment, and referring now to FIG. 4, a user-plane protocol stack 400 employed by various communication units, is illustrated. The communication path of an MBMS data packet 430 traverses from an eBM-SC 410 through an eMBMS gateway 405 and a DeNB 210 to a RN 224 and thereafter one or more UEs 226. In this example, the RN 224 may be configured with enhanced functionality to de-multiplex multiple eMBMS streams to various UE's, such as UE 226. In this example, the RN 224 may perform functions in a similar manner to an intelligent repeater, inasmuch as the RN 224 may comprise sufficient transceiver and signal processing functionality/modules to attempt to unpack all the protocol layers, e.g. the radio link control (RLC) layer, the medium access control (MAC) layer and the physical (PHY) layer from the transmission from the DeNB 210. In essence, the protocol stack for the receive side of the RN 224 may appear similar to the MBMS protocol stack for the UE 226 (in a conventional non-RN deployment).

The transmit side of the RN 224 may appear similar to the transmit protocol stack of a DeNB 210 (in a network without a relay node), with an exception in one example embodiment that the MBMS packet may be re-constructed 435, 440 in the RN 224. The UE protocol stack is shown as per a system without a RN, with the received, re-constructed MBMS data packet 445 decoded.

In this example, there may be a number of benefits in unpacking all the protocol layers in the RN 224. For example, if the RN 224 is unable to decode one of the MBMS packet data blocks that make up a complete MBMS data packet, the RN 224 may not relay the complete MBMS packet to UE's, such as UE 226, under the RN 224. This scenario avoids the RN 224 needlessly forwarding transport blocks that the UE 226 would only ever be able to use in formulating a partial MBMS packet); at least for example for the case of single cell broadcast from the RN 224. Furthermore, in this example, the RN 224 may be able to transmit a subset of the services that are available on the DeNB 210, so that some de-multiplexing of services and some re-packaging of a subset of services can be performed at the RN 224.

In accordance with a first example embodiment of the invention, the user-plane protocol stack 400 comprises the RN 224 measuring a physical layer signal quality of the MBMS packet 430 received from the DeNB 210, for example a received signal power indication. In this first example, a power control module 425 in the RN 224 wirelessly provides via signal 222 the received signal quality information to the DeNB power control module 420.

In accordance with a second example embodiment of the invention, the user-plane protocol stack 400 comprises the RN 224 un-packing the received MBMS packet 430 to determine a higher layer signal quality of the MBMS packet 430 received from the DeNB 210, for example more detailed received signal power indication, such as a bit/frame error rate, or a received SIR value or received signal power or some other such indicia. In some examples, an outer loop power control BLER may be used, determined from measurements of error rate in transport blocks (at the medium access control (MAC) layer). In this manner, the unpacking may be kept at a relatively low level in the ISO layers, so that this unpacking does not have to be performed all the way up to the MBMS layer. In this regard, it is noted that an MBMS packet may be carried across multiple MAC blocks. In this second example, the power control module 425 in the RN 224 may also wirelessly provide via signal 222 the received signal power indication of the signal quality to the DeNB power control module 420.

Figure 5:
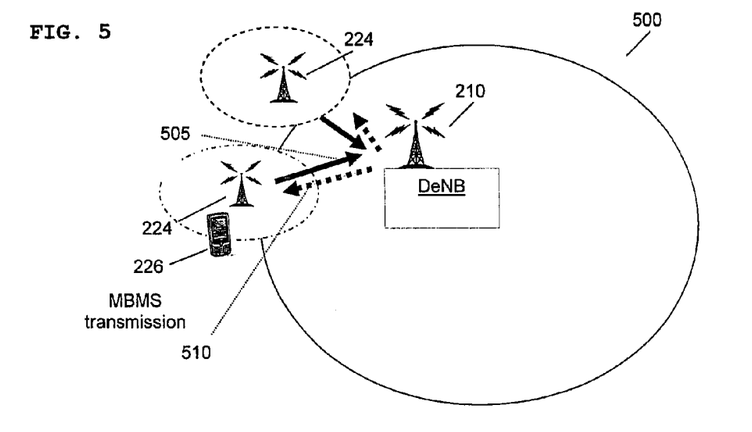
FIG. 5 illustrates an example of a 3GPP™ wireless cellular communication system employing at least one relay node in accordance with an example embodiment of the present invention.

Referring now to FIG. 5, an example of a 3GPP™ wireless cellular communication system 500 employing at least one relay node is illustrated in accordance with an example embodiment of the present invention. In particular, FIG. 5 illustrates a wireless communication system showing eMBMS broadcast transmissions 510 from a DeNB 210 to RNs 224 within coverage of the DeNB 210, in accordance with some example embodiments of the invention.

In one example, the receiver 306 and signal processing module 308 of the RN 224 use the information provided in the broadcast transmissions 510 to determine whether a power control adjustment of the broadcast transmissions 510 by the DeNB 210 would be beneficial (at least to that individual RN 224). In one example, the receiver 306 and signal processing module 308 of the RN 224 determine a signal quality level, such as a bit error rate (BER), frame error rate (FER), or block error rate (BLER), of a received broadcast transmission 510. In some examples, the BLER value may be used as an input to the outer loop power control, whereas the inner loop power control may send power up/down commands, which may be driven off of SIR values. In this example, driving the inner loop power control values of SIR values can provide a benefit if the power control period is shorter than the period for transmitting a complete frame/packet. In response to the determined signal quality level, for example whether the determined signal quality level is above or below a signal quality threshold, the RN 224 may transmit a power control request or command to the broadcasting DeNB 210.

In one example embodiment of the invention, in a scenario where the RN 224 may be associated with just a single DeNB 210 (for example if the Un connection is used also to relay unicast traffic for transmission to/from the RN 224), the transmitter 322 and signal processing module 308 of the RN 224 may transmit at least one power control feedback request or command to only this serving DeNB on an uplink Un channel.

In some examples, the broadcast transmission to the RN 224 may use a single cell multicast broadcast single frequency network (MBSFN) transmission from a DeNB 210. In other example embodiments, the broadcast transmission to the RN 224 may use multi-cell MBSFN transmissions from multiple DeNBs 210, for example the same physical channel may be transmitted from multiple DeNB's such that combining at the physical layer at the RN 224 may be achieved. In this example, transmissions from multiple sites may appear as different radio paths in a mutipath delay profile.

In one example embodiment of the invention, where a multi-DeNB MBSFN downlink transmission is used (and/or where a dedicated uplink channel to a specific associated DeNB 210 is not available), RN 224 may utilise an uplink common channel to transmit at least one power control feedback request or command to multiple DeNBs 210. In one example, the RN 224 may be arranged to transmit power 'DOWN' commands on one shared random access channel (RACH) set of preambles, and may be arranged transmit Power 'UP' commands on another shared set of RACH preambles. In one such example, the same RACH preambles may be made available in all cells. This simplifies the process to be performed at each DeNB 210. For example, at each DeNB 210, if the energy received on any of the RACH power 'UP' preambles exceeds a particular first threshold, then the transmit power of the DeNB 210 may be increased (subject to maximum transmit power constraints) by the DeNB 210. However, if the receive energy on the power 'UP' preambles is below the threshold, but the received energy on the power 'DOWN' preambles exceeds a particular second threshold, thereby indicating that a number of UEs requesting the power 'DOWN' are nearby, then the transmit power may be decreased (subject to minimum transmit power constraints) by the DeNB 210.

Thus, advantageously, no modification to the core network and associated services/applications is required to achieve some example aims of the aforementioned embodiments.

Clearly, one solution to a decision on how to set the DeNB transmit power would simply be to transmit the MBSFN at maximum power all the time. However, in a number of practical scenarios, such a solution would not be ideal, and the herein described examples may assist in alleviating some of the practical deficiencies. For example, if a DeNB, such as DeNB 210 of FIG. 2, is at an edge of an MBSFN area (e.g. at an edge of an MBSFN island, next to a unicast only 'sea') and if the RN, such as RN 224 of FIG. 2 does not itself transmit on the same time/freq resource as the DeNB MBSFN transmission, then the herein described benefit of minimising the DeNB transmit power is that the time/frequency resources that are being used for MBMS transmission from the DeNB can be reused more rapidly (e.g. by cells in the unicast 'sea' that are closer to the MBSFN island than would otherwise be the case).

In other example scenarios, if the RN itself wants to make use of the same time/frequency resources that had been used on the DeNB-RN connection then there may also be a benefit if the MBMS transmission from the DeNB is received by the RN as 'quietly' as possible (i.e. at a lowest power possible), so that interference to UEs on the RN-UE (Uu) interface from the DeNB MBMS transmission is minimised.

Figure 6:
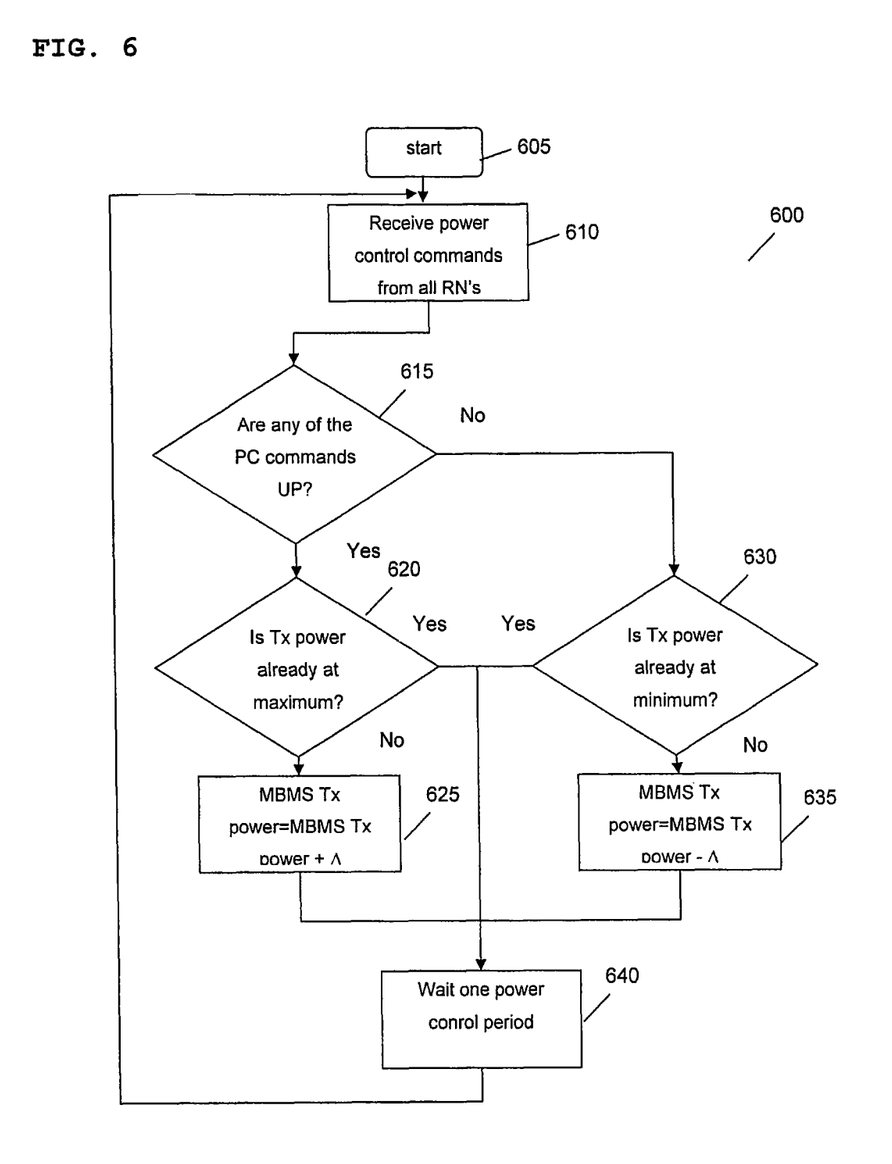
FIG. 6 illustrates an example of a flowchart employed at a donor eNodeB to support broadcast communication to a wireless communication unit in accordance with some example embodiments of the invention.
Figure 7:
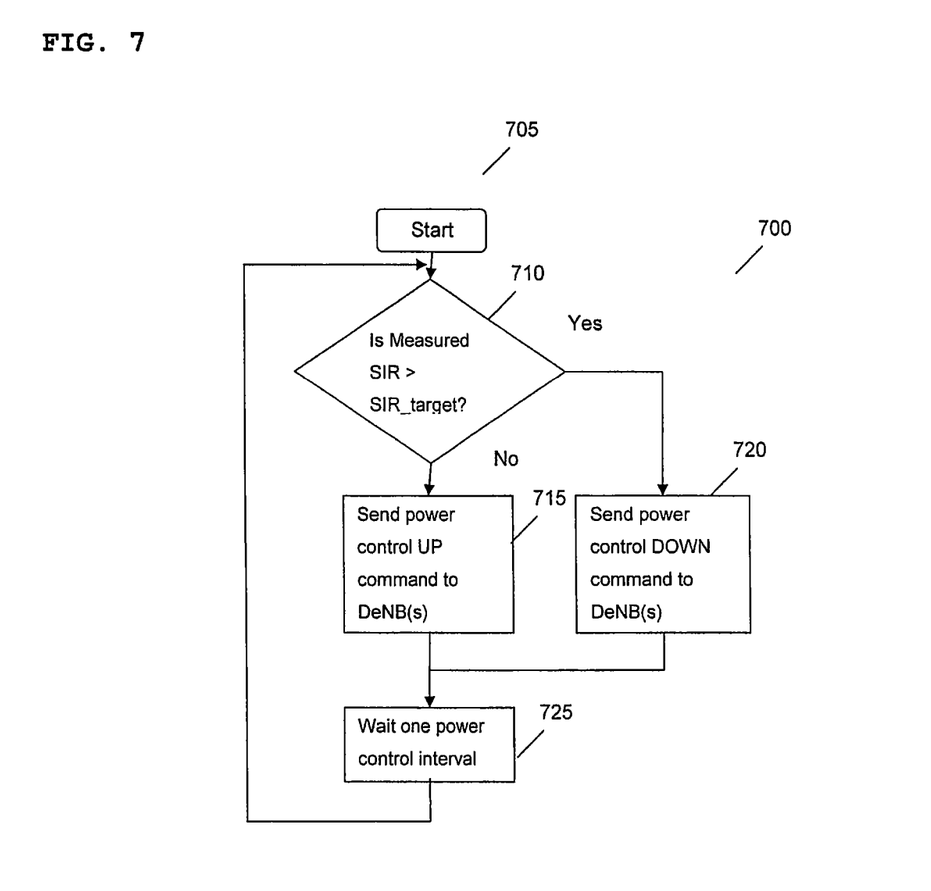
FIGS. 7 and 8 illustrate examples of flowcharts employed at a Relay Node to support broadcast communication by a wireless communication unit in accordance with some example embodiments of the invention.
Figure 8:
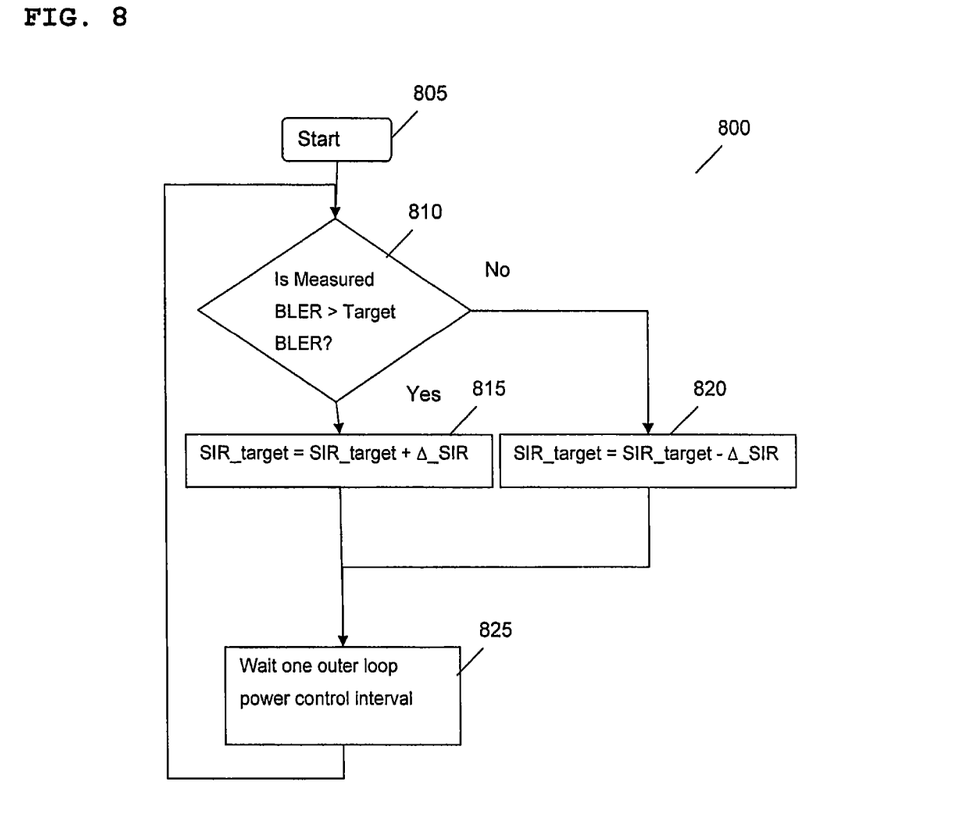

In accordance with some example embodiments, a power control algorithm operating between at least one RN 224 and one or more DeNB 210 may be used to improve a probability that the at least one RN 224 correctly decodes the DeNB MBMS transmissions. In some examples, the power control algorithm uses RNs that are associated with a particular DeNB over the Un interface, inasmuch as the RN is configured to send power control commands back to the DeNB. In some example embodiments, as described with reference to FIGS. 6-8, the DeNB 210 may increase the power of the MBMS transmission if any of the RNs request a 'power up' (at least up to some maximum transmit power level, which in some examples, may be made dependent upon cell planning restrictions and/or the DeNB power amplifier (PA) capabilities. Alternatively, in some examples, the DeNB 210 may decrease the power of the MBMS transmission if both the following conditions are met:

A plurality, e.g. in some examples all, of the relay nodes request a power 'DOWN', i.e. a decrease in the broadcast transmit power level; and the broadcast transmit power level is not already at a minimum level, where in some examples a minimum level may be set for the purposes of ensuring that UEs within the coverage of the DeNB 210 receive the MBMS traffic.

Otherwise MBMS power level may be left unchanged.

In this manner, a probability of all relay nodes receiving the MBMS transmissions from the DeNB's correctly may be significantly improved, such that application layer frame loss rates for each of the many MBMS UEs that are under the coverage of each of the relay nodes is also significantly improved. Such improvement, in part, may be due to an overall reduction in interference following a reduction in radiated transmit power within the DeNB's cell.

Referring now to FIG. 6, an example of a flowchart 600 to support power control at a DeNB 210 is illustrated. The flowchart 600 commences in step 605 and moves onto step 610 where the DeNB 210 receives power control commands from a number and, in some instances, all RNs within the coverage area of the DeNB, as shown in step 610. A determination is then made by the DeNB 210 as to whether any of the power control (PC) commands is an increase ('UP') command, as shown in step 615. If any of the power control (PC) commands is an increase ('UP') command in step 615, the method moves to step 620, where the DeNB 210 determines whether the transmit power is already at a maximum level? If, in step 620, the transmit power is not already at a maximum level, the process moves to step 625, where the MBMS $T_x$ power is set to be equal to the MBMS $T_x$ power+a delta ($\Delta$) value. If, in step 620, the transmit power is already at a maximum level, the process moves to step 640, where there Is a waiting period of one power control period before the process loops back to step 610.

If all the PC commands are 'DOWN', in step 615, the method moves to step 630, where the DeNB 210 determines whether the transmit power is already at a minimum level? If, in step 630, the transmit power is not already at a minimum level, the process moves to step 635, where the MBMS transmit power is set to be equal to the MBMS transmit power−a delta ($\Delta$) value. If, in step 620, the transmit power is already at a minimum level, the process moves to step 640, where there is a waiting period of one power control period before the process loops back to step 610. In one example embodiment, a 'power control period' might be, say, a 0.5 ms slot in an LTE system.

In some examples, the delta value may be fixed or hard coded. For example, since an objective is to follow fast fading changes (that may exhibit channel attenuation of e.g. 20 dB) a 1 dB step up/step down might be appropriate. Hence, in some examples, the power up/power down may be a multiplier (e.g. the delta in the flowcharts may be considered in terms of dB's) and may not be an absolute power increment.

In some examples, the RN may attempt to return a calculated delta value of the magnitude of the requested power up/power down amount. In such a scenario, a calculation of magnitude of power up/down may be based on a difference between measured SIR and target SIR.

Referring now to FIG. 7, an example of a flowchart 700 to support a generation of power control commands at a RN, such as RN 224, is illustrated. The flowchart 700 commences in step 705 and moves onto step 710, where it is determined whether a measured quality level, for example a measured power level at the RN 224 or a signal-to-interference (SIR) level is greater than a target measured received power level or target SIR level. In some examples, BLER, frame error rate, etc. may only be used internally within the RN 224 for the purposes of adapting the outer power control loop (e.g. adapting SIR target value) and may not be communicated to the DeNB.

In some examples, the BLER value may be used as an input to the outer loop power control, whereas the inner loop power control may send power up/down commands, which may be driven off of SIR values. In this example, driving the inner loop power control values off of SIR values can provide a benefit if the power control period is shorter than the period for transmitting a complete frame/packet.

In some examples, if the measured SIR level is greater than the target SIR level, the method moves onto step 715 where a power control 'DOWN' command may be sent to the DeNB(s) 210. An 'UP' command indicates that the RN 224 wants the transmit power of the DeNB 210 to be increased. If the measured SIR level is not greater than the target SIR level, the method moves onto step 720 where a power control 'UP' command is sent to the DeNB(s) 210. A 'DOWN' command indicates that the RN 224 can accept the MBMS transmit power from the DeNB 210 being decreased. The method then moves onto step 725, where there is a waiting period of one power control interval before the process loops back to step 710. In one example embodiment, a 'power control period' might be, say, a 0.5 ms slot in an LTE system.

Referring now to FIG. 8, an example of a flowchart 800 to support outer loop power control at a RN, such as RN 224, is illustrated. The flowchart 800 commences in step 805 and moves onto step 810, where it is determined whether a measured block error rate (BLER) of transmissions from a DeNB 210 is greater than a target BLER. If the measured block error rate (BLER) of transmissions from a DeNB 210 is greater than a target BLER in step 810, the method moves on to step 815 where the signal-to-interference (SIR) target is set to equal the SIR target+(a delta) $\Delta$_SIR. If the measured block error rate (BLER) of transmissions from a DeNB 210 is not greater than a target BLER in step 810, the method moves to step 820 where SIR target is set to equal the SIR target−(a delta) $\Delta$_SIR. In some example embodiments, a bit error rate may be used in contrast to a BLER. Following step 815 or step 820 the method then moves on to step 825, where there is a waiting period of one outer loop power control interval before the process loops back to step 810. In one example embodiment, an 'outer loop power control period' may be, say, every frame or every other frame (for example in every 10 msec. period) in an LTE system.

Figure 9:
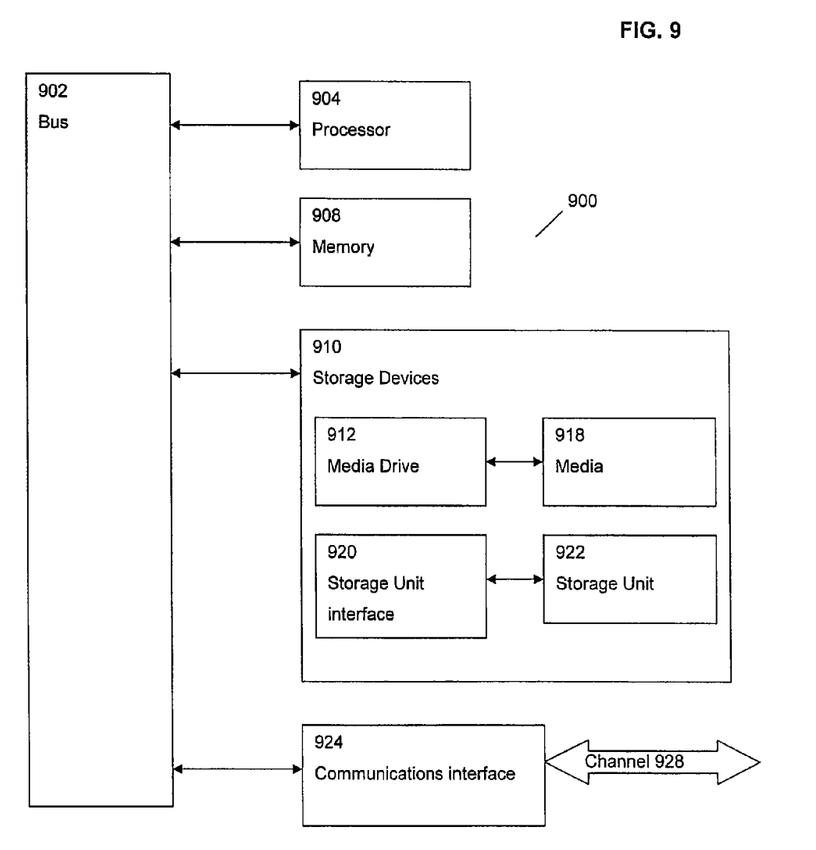
FIG. 9 illustrates a typical computing system that may be employed to implement signal processing functionality in embodiments of the invention.

Referring now to FIG. 9, there is illustrated a typical computing system 900 that may be employed to implement signal processing functionality in embodiments of the invention. Computing systems of this type may be used in access points and wireless communication units. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special-purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having particular computer software or data stored therein.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc. Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network Interface, a local or wide area network, and other communications channels.

In this document, the terms 'computer program product' 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 922, drive 912 or communications interface 924. The control logic (in this example, software instructions or computer program code), when executed by the processor 904, causes the processor 904 to perform the functions of the invention as described herein.

In one example, a tangible non-transitory computer program product comprises executable program code for supporting power control in a wireless broadcast communication system that comprises a plurality of communication cells, with broadcast content being routed from a base station to at least one wireless communication unit via at least one relay node (RN). The executable program code may be operable for, when executed at the base station, performing power control in a wireless broadcast communication system that comprises a plurality of communication cells, with broadcast content being routed from a base station to at least one wireless communication unit via at least one relay node (RN). The executable program code may be operable for broadcasting the broadcast content from the base station to at least one RN; receiving from the at least one RN an indication of signal quality of the broadcast content as received at the at least one RN; and adjusting a transmit power level of a broadcast transmission of broadcast content in response to the indication.

In one example, a tangible non-transitory computer program product comprises executable program code for supporting power control in a wireless broadcast communication system that comprises a plurality of communication cells, with broadcast content being routed from a base station to at least one wireless communication unit via at least one relay node (RN). The executable program code may be operable for, when executed at the relay node: receiving broadcast content from the base station; determining an indication of signal quality of the broadcast content as received at the RN; transmitting the indication of signal quality of the broadcast content to the base station; and receiving subsequent broadcast content from the base station at an adjusted transmit power level in response to the indication.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the signal processing module 308 has been illustrated and described as a single processing module, whereas in other implementations it may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second", etc. do not preclude a plurality.

The invention claimed is:

1. A method for power control in a wireless broadcast communication system that comprises a plurality of communication cells, with broadcast multimedia content being routed from a base station to at least one wireless communication unit via at least one relay node (RN), the method comprising, at the base station:
    broadcasting the broadcast multimedia content from the base station to at least one RN;
    receiving from the at least one RN an indication of signal quality of the broadcast multimedia content as received at the at least one RN;
    determining, in response to said receiving the indication of signal quality of the broadcast multimedia content, whether an adjustment of a transmit power level of a subsequent broadcast transmission of broadcast multimedia content will improve a decoding operation applied to the broadcast multimedia content at the at least one RN; and
    adjusting the transmit power level of the subsequent broadcast transmission of broadcast multimedia content in response to said determining that the adjustment of the transmit power level of the subsequent broadcast transmission of broadcast multimedia content will improve the decoding operation applied to the broadcast multimedia content at the at least one RN.

2. The method of claim 1, wherein the indication of signal quality received from the at least one RN comprises at least one from a group consisting of: a recommendation for an increase or decrease in the transmit power level of the broadcast multimedia content, and a command for an increase or decrease in the transmit power level of the broadcast multimedia content.

3. The method of claim 2, wherein said receiving the indication of signal quality from the at least one RN comprises receiving an indication of an amount to increase or decrease the transmit power level of the broadcast multimedia content in the recommendation for the increase or decrease in the transmit power level of the broadcast multimedia content.

4. The method of claim 1, wherein said receiving the indication of signal quality received from the at least one RN comprises at least one from a group of:
    receiving a bit error rate of the broadcast multimedia content received at the at least one RN;
    receiving a frame error rate of the broadcast multimedia content received at the at least one RN;
    receiving a block error rate of the broadcast multimedia content received at the at least one RN;
    receiving a signal-to-interference ratio (SIR) indication as measured at the at least one RN; and
    receiving a received signal power indication of the broadcast multimedia content as received at the at least one RN.

5. The method of claim 1, further comprising determining, in response to the indication of signal quality of the broadcast multimedia content, whether the transmit power level of the subsequent broadcast transmission of broadcast multimedia content is adjustable in accordance with communication circumstances that the base station is operating in.

6. The method of claim 5, further comprising determining whether a proposed transmit power level of a broadcast transmission of broadcast multimedia content exceeds a first threshold or is below a second threshold.

7. The method of claim 6, further comprising decreasing the transmit power of the broadcast transmission when a plurality of receiving relay nodes request decrease.

8. The method of claim 1, wherein said adjusting the transmit power level of the subsequent broadcast transmission of broadcast multimedia content in response to the indication comprises adding or subtracting a transmit power control delta value from a current transmit power level following a waiting period.

9. The method of claim 1, wherein the base station is a donor eNodeB in a Long Term Evolution (LTE) version of a Third Generation Partnership Project system.

10. A non-transitory computer readable medium comprising computer executable program code for supporting power control in the wireless broadcast communication system that comprises the plurality of communication cells, with broadcast multimedia content being routed from the base station to the at least one wireless communication unit via the at least one relay node (RN), the executable program code operable for, when executed at the base station, performing the method of claim 1.

11. The method of claim 1, wherein said determining whether the adjustment of the transmit power level of the subsequent broadcast transmission of broadcast multimedia content will improve the decoding operation applied to the broadcast multimedia content at the at least one RN is based on whether the received indication of signal quality of the broadcast multimedia content exceeds a predetermined inner power control loop threshold level.

12. A base station for supporting power control in a wireless broadcast communication system that comprises a plurality of communication cells, with broadcast multimedia content being routed from the base station to at least one wireless communication unit via at least one relay node (RN), the base station comprising:
 memory; and
 a processor configured based on instructions in the memory to
 broadcast the broadcast multimedia content from the base station to at least one RN;
 receive from the at least one RN an indication of signal quality of the broadcast multimedia content as received at the at least one RN;
 determine, in response to receipt of the indication of signal quality of the broadcast multimedia content, whether an adjustment of a transmit power level of a subsequent broadcast transmission of broadcast multimedia content will improve a decoding operation applied to the broadcast multimedia content at the at least one RN; and
 adjust the transmit power level of the subsequent broadcast transmission of broadcast multimedia content in response to the determination that the adjustment of the transmit power level of the subsequent broadcast transmission of broadcast multimedia content will improve the decoding operation applied to the broadcast multimedia content at the at least one RN.

13. An integrated circuit for a base station to support power control in a wireless broadcast communication system that comprises a plurality of communication cells, with broadcast multimedia content being routed from the base station to at least one wireless communication unit via at least one relay node (RN), the integrated circuit comprising:
 memory; and
 a processor configured based on instructions in the memory to
 broadcast the broadcast multimedia content from the base station to at least one RN;
 receive from the at least one RN an indication of signal quality of the broadcast multimedia content as received at the at least one RN;
 determine, in response to receipt of the indication of signal quality of the broadcast multimedia content, whether an adjustment of a transmit power level of a subsequent broadcast transmission of broadcast multimedia content will improve a decoding operation applied to the broadcast multimedia content at the at least one RN; and
 adjust the transmit power level of the subsequent broadcast transmission of broadcast multimedia content in response to the determination that the adjustment of the transmit power level of the subsequent broadcast transmission of broadcast multimedia content will improve the decoding operation applied to the broadcast multimedia content at the at least one RN.

14. A method for power control in a wireless communication system that comprises a plurality of communication cells, with broadcast multimedia content being routed from a base station to at least one wireless communication unit via a relay node (RN), the method comprising, at the relay node:
 receiving broadcast multimedia content from the base station;
 determining an indication of signal quality of the broadcast multimedia content as received at the RN;
 transmitting the indication of signal quality of the broadcast multimedia content to the base station; and
 receiving subsequent broadcast multimedia content from the base station at an adjusted transmit power level in response to the indication based on a determination, responsive to the indication of signal quality of the broadcast multimedia content, that an adjustment of the transmit power level of the subsequent broadcast multimedia content to the adjusted transmit power level will improve a decoding operation applied by the RN to the subsequent broadcast multimedia content.

15. The method of claim 14, wherein the indication of signal quality comprises at least one from a group consisting of: a recommendation for an increase or decrease in the transmit power level of the broadcast multimedia content, and a command for an increase or decrease in the transmit power level of the broadcast multimedia content.

16. The method of claim 15, wherein said transmitting the indication of signal quality comprises transmitting an indication of an amount to increase or decrease the transmit power level of the broadcast multimedia content in the recommendation for the increase or decrease in the transmit power level of the broadcast multimedia content.

17. The method of claim 14, wherein said transmitting the indication of signal quality received comprises at least one from a group of:
 transmitting a bit error rate of the broadcast multimedia content received at the RN;
 transmitting a frame error rate of the broadcast multimedia content received at the RN;
 transmitting a block error rate of the broadcast multimedia content received at the RN;
 transmitting a signal-to-interference ratio (SIR) indication as measured at the at least one RN; and
 transmitting a received signal power indication of the broadcast multimedia content as received at the RN.

18. The method of claim 14, wherein said receiving the subsequent broadcast multimedia content from the base station at the adjusted transmit power level in response to the indication comprises receiving subsequent broadcast multimedia content with an added or subtracted transmit power control delta value from a current transmit power level following a waiting period.

19. The method of claim 14, wherein the relay node is configured to support a Long Term Evolution (LTE) version of a Third Generation Partnership Project system.

20. A relay node for supporting power control in a wireless broadcast communication system that comprises a plurality of communication cells, with broadcast multimedia content being routed from a base station to at least one wireless communication unit via the relay node (RN), the RN comprising:
- a receiver configured to receive broadcast multimedia content from the base station;
- signal processing circuitry configured to determine an indication of signal quality of the broadcast multimedia content as received at the RN; and
- a transmitter configured to transmit the indication of signal quality of the broadcast multimedia content to the base station,
- wherein the receiver is configured to receive subsequent broadcast multimedia content from the base station at an adjusted transmit power level in response to the indication based on a determination, responsive to the indication of signal quality of the broadcast multimedia content, that an adjustment of the transmit power level of the subsequent broadcast multimedia content to the adjusted transmit power level will improve a decoding operation applied by the RN to the subsequent broadcast multimedia content.

21. An integrated circuit for supporting power control in a wireless broadcast communication system that comprises a plurality of communication cells, with broadcast multimedia content being routed from a base station to at least one wireless communication unit via a relay node (RN), the integrated circuit comprising:
- a receiver configured to receive broadcast multimedia content from the base station;
- signal processing circuitry configured to determine an indication of signal quality of the broadcast multimedia content as received at the RN; and
- a transmitter configured to transmit the indication of signal quality of the broadcast multimedia content to the base station,
- wherein the receiver is configured to receive subsequent broadcast multimedia content from the base station at an adjusted transmit power level in response to the indication based on a determination, responsive to the indication of signal quality of the broadcast multimedia content, that an adjustment of the transmit power level of the subsequent broadcast multimedia content to the adjusted transmit power level will improve a decoding operation applied by the RN to the subsequent broadcast multimedia content.

* * * * *